United States Patent
Michioka et al.

[11] Patent Number: 6,113,272
[45] Date of Patent: Sep. 5, 2000

[54] ROLLING MOTION GUIDE APPARATUS

[75] Inventors: Hidekazu Michioka; Tadashi Hirokawa, both of Tokyo-to, Japan

[73] Assignee: THK Co., Ltd., Tokyo-to, Japan

[21] Appl. No.: 09/317,185

[22] Filed: May 24, 1999

[30] Foreign Application Priority Data

May 28, 1998 [JP] Japan ............................ P10-147417

[51] Int. Cl.[7] .............................................. F16C 29/06
[52] U.S. Cl. ............................................. 384/15; 384/45
[58] Field of Search ................................. 384/45, 15

[56] References Cited

U.S. PATENT DOCUMENTS

| | | | |
|---|---|---|---|
| 4,918,846 | 2/1999 | Tsukada | 384/15 |
| 5,011,300 | 4/1991 | Teramachi | 384/45 X |
| 5,492,412 | 2/1996 | Tsukada | 384/15 |
| 5,588,750 | 12/1996 | Osawa et al. | 384/15 |
| 5,871,282 | 2/1999 | Yuasa | 384/15 |

*Primary Examiner*—Thomas R. Hannon
*Attorney, Agent, or Firm*—Young & Thompson

[57] ABSTRACT

A rolling motion guide apparatus comprises a track member having a rolling member rolling groove along a longitudinal direction of the track member, a plurality of rolling members rolling along the rolling member rolling groove of the track member, a movable member having a loaded rolling member rolling groove which constitutes a loaded rolling member rolling passage in association with the rolling member rolling groove of the track member. The movable member is movable along the track member through the rolling members rolling in the loaded rolling member rolling passage. A seal member is provided on a surface of the movable member facing the track member. The seal member is composed of a base plate portion disposed along the surface of the movable member facing the track member and sealing portions disposed to longitudinal side edge portions of the base plate portion so as to be contacted to the track member. The base plate portion is formed of resin material different from resin material of which the sealing portions are formed. The base plate portion and the sealing portions is integrally molded with each other through an extrusion process.

11 Claims, 7 Drawing Sheets

ROLLING MOTION GUIDE APPARATUS

BACKGROUND OF THE INVENTION

The present invention relates to a rolling motion guide apparatus having a seal member which is formed by integrally molding different parts or members with each other through an extrusion molding process and also relates to a rolling motion guide apparatus having such a seal member which is mounted on the apparatus by a new engaging or mounting method.

A rolling motion guide apparatus is well known as a means for conveying various machines or machinery. Such a rolling motion guide apparatus is provided with a track member and a movable member mounted on the track member in a straddle manner so as to be movable through a plurality of rolling members. When the movable member is moved along the track member, the machine or machinery mounted on the movable member is also moved. In such a rolling motion guide apparatus, the rolling members roll and circulate in an endless circulation passage formed by the combination of the rolling member rolling grooves formed on the movable member and the track member in accordance with the movement of the movable member.

In the known art, to such a rolling motion guide apparatus, a seal member is attached for protecting the rolling member and the endless circulation passage to prevent invasion of an external foreign material as well as leakage of a lubricant with which the endless circulation passage is filled. Particularly, in a case where it is desired to seal a gap formed between an upper surface of the track member and a surface of the movable member facing the upper surface of the track member, a plate-like seal member having sealing portions at its side edges is provided on the surface of the movable member facing the track member so as to seal the gap, as disclosed for example in Japanese Patent Laid-open (KOKAI) Publication No. HEI 7-286617.

A seal member utilized in the prior art is obtained by forming sealing portions of resin material, rubber material or the like and then joining the thus formed sealing portions on the peripheral edge portion of a base plate portion formed of a flat iron plate or the like, by a bonding method such as a thermal bonding method. Such a seal member is mounted on the movable member by fastening means such as screws prepared independently.

In the conventional method mentioned above, however, the seal member is formed by joining the base plate portion and the sealing portions after independently forming these portions, and accordingly, the number of parts or members to be used is increased and the manufacturing processes are also increased, which will require complicated manufacturing workings, in addition to a problem that the sealing portions may easily come off the base plate portion. In the above-mentioned prior art document of Japanese Patent Laid-open (KOKAI) Publication No. HEI 7-286617, there has been proposed one example for solving the problem. In that document, the base plate portion is formed so as to provide a stepped side edge portion for increasing a portion or area to be joined to the sealing portion. The formation of the base plate portion having such a stepped portion will make the manufacturing working further complicated.

Furthermore, in the conventional structure in which the base plate portion of the seal member has a flat shape, the seal member has a low rigidity and is easily plastically deformable. When the base plate portion is plastically deformed, the sealing portion is also deformed, and a gap will be hence caused between the front end of the sealing portion of the seal member and the track member, leading to reduction of the sealing function of the seal member.

On the other hand, in the conventional method in which the seal member is attached to the movable member by using the screw, parts to be used are increased and the manufacturing working and time are also increased and complicated, requiring much time, resulting in an increased production cost. Furthermore, in the method mentioned in the above Japanese Patent Publication in which the base plate portion and the sealing portion are joined without using any specific fastening means, it is required for the base plate portion to be formed into a specific shape.

SUMMARY OF THE INVENTION

An object of the present invention is to substantially eliminate defects or drawbacks encountered in the prior art mentioned above and to provide a rolling motion guide apparatus provided with a seal member capable of preventing a sealing portion from being detached or peeled off from a base plate portion so as to provide an improved rigidity and dimensional accuracy and also capable of having a mounting member for easily and surely mounting the seal member.

This and other objects can be achieved according to the present invention by providing, in one aspect, a rolling motion guide apparatus comprising:

a track member provided with a rolling member rolling groove along a longitudinal direction of the track member;

a plurality of rolling members rolling along the rolling member rolling groove formed on the track member;

a movable member provided with a loaded rolling member rolling groove which constitutes a loaded rolling member rolling passage in association with the rolling member rolling groove formed on the track member, the movable member being movable along the track member through the rolling members rolling in the loaded rolling member rolling passage; and a seal member provided on a surface of the movable member facing the track member, wherein the seal member comprises a base plate portion disposed along the surface of the movable member facing the track member and sealing portions disposed to longitudinal side edge portions of the base plate portion so as to be contacted to the track member, the base plate portion being formed of resin material different from resin material of which the sealing portions are formed, and the base plate portion and the sealing portions being integrally molded with each other through an extrusion process.

In a preferred embodiment in this aspect, the base plate portion is provided with an abutting portion having a surface which is perpendicular to the moving direction of the movable member and which has substantially a trapezoidal shape in section. The base plate portion may have a central portion in its sectional view which has a thickened portion and the side edge portions on which the sealing portions are disposed and which have thin thickness portions with respect to the thickened portion. The base plate portion and the sealing portions may be formed of different kinds of thermoplastic materials respectively.

According to this aspect of the present invention, the seal member is formed by integrally molding the base plate portion and the sealing portions with each other, and the formation and attachment of these portions can be carried out through a single extrusion molding process, which can reduce much time and labor for the manufacture thereof. The integral extrusion molding of the base plate portion with the sealing portions causes these portions to be formed into a single formed body. It is therefore possible to prevent the sealing portions from being separated from the base plate portion.

Furthermore, since the base plate portion can be held on the movable member by abutting the abutting portion against the movable member, the seal member can surely attached. The rigidity of the base plate portion can extremely be improved in comparison with a case in which the seal member is formed of a single plate member, and the deformation thereof can be also prevented, resulting in the realization of the improved sealing function.

Still furthermore, the formation of the thickened portion of the base plate portion can improve the strength and rigidity thereof and can prevent the deformation of the seal member at a time when the seal member is fitted to the engaging portion of the side cover.

In another aspect of the present invention, the above object can be achieved by providing a rolling motion guide apparatus comprising:

a track member provided with a rolling member rolling groove along a longitudinal direction of the track member;

a plurality of rolling members rolling along the rolling member rolling groove formed on the track member;

a movable member provided with a loaded rolling member rolling groove which constitutes a loaded rolling member rolling passage in association with the rolling member rolling groove formed on the track member, the movable member being movable along the track member through the rolling members rolling in the loaded rolling member rolling passage;

side covers fixed on both end surfaces of the movable member in the moving direction thereof; and a seal member provided on a surface of the movable member facing the track member, wherein the seal member comprises a base plate portion disposed along the surface of the movable member facing the track member and sealing portions disposed to longitudinal side edge portions of the base plate portion so as to be contacted to the track member, the side covers and the base plate portion are formed with engaging portions respectively, which are engaged with each other so as to hold the base plate portion of the seal member on the surface of the movable member facing the track member, and the base plate portion of the seal member is mountable on the end portions of the movable member through the engaging portions, with the side covers being fixed thereto.

In a preferred embodiment of this aspect, the base plate portion is provided with an abutting portion having a surface which is perpendicular to the moving direction of the movable member and which has substantially a trapezoidal shape in section.

In this aspect, also as mentioned in the above aspect, the base plate portion has a central portion in its sectional view which has a thickened portion and the side edge portions on which the sealing portions are disposed and which have thin thickness portions with respect to the thickened portion. The base plate portion may be formed of resin material different from resin material of which the sealing portions are formed, and the base plate portion and the sealing portions may integrally be molded with each other through an extrusion process. The base plate portion and the sealing portions may be formed of different kinds of thermoplastic materials respectively.

Furthermore, the engaging portion formed on each of the side covers at a portion facing a surface of the track member comprises a recessed fit portion having a size allowing the base plate portion to be fitted and engaging claw pieces engaged with engaging groove formed on the base plate portion, and each of the engaging claw pieces may have an inclined surface portion along which the base plate portion slides when fitted.

According to this aspect, in addition to the above one aspect, the seal member can be mounted on the movable member without using any other means, which results in the reduction of parts to be used and the manufacturing cost down, as well as the working time and labor. Furthermore, the seal member can easily be mounted without forming the base plate portion thereof so as to provide a specific shape. Since the seal member can be mounted merely by press-fitting the end portion of the seal member, it can be mounted on the movable member with the side covers being attached, improving the assembling working.

The nature and further characteristic features of the present invention can be made more clear from the following descriptions with reference to the accompanying drawings.

DESCRIPTION OF THE PREFERRED EMBODIMENTS

Figure 1:
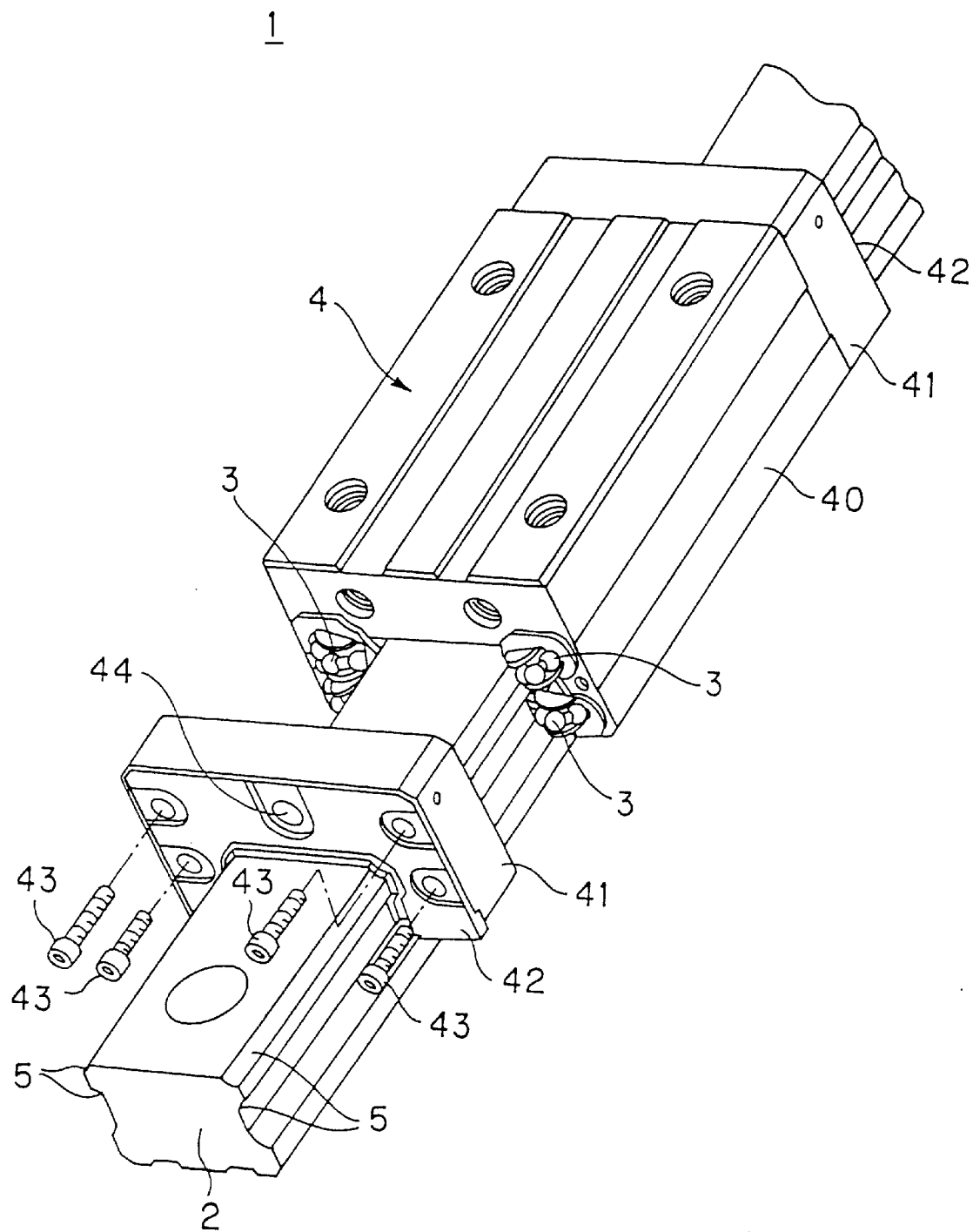
FIG. 1 is a perspective view of a rolling motion guide apparatus, partially cut away, according to one embodiment of the present invention.

One preferred embodiment of a rolling motion guide apparatus of the present invention will be described hereunder with reference to FIGS. 1 to 3.

The rolling motion guide apparatus 1 of this embodiment is provided with a track member 2 and a movable member 4 which is mounted on the track member in a straddle manner through a plurality of spherical rolling members 3—3 such as balls so as to be freely movable on and along the track member 2.

The track member 2 is a member having a surface, rectangular in cross section, perpendicular to the longitudinal direction thereof and formed with two rows of rolling member rolling grooves 5, 5 on each side surface, totally four grooves, so as to extend throughout the entire longitudinal direction of the track member 2. Each row of rolling member rolling grooves shows substantially a semi-circular shape. In the embodiment of FIG. 1, although the track member 2 has a linear shape, it may be formed so as to provide a curved structure. Furthermore, the number of the rolling member rolling grooves is not limited to the described embodiment and other arrangements may be taken, for example, one row in each side, totally two rows. There may be taken further another arrangement having the total number of rows of three.

On the other hand, the movable member 4 has a cross sectional surface having an inverse U-shape, perpendicular to the moving direction of the movable member 4. The movable member 4 is mounted on the track member 2 so as to straddle the same through a plurality of spherical rolling members 3—3 rolling in the passage composed of the groove formed on the inner surface of the movable member 4 and the groove formed on the outer surface of the track member 2. The movable member 4 is composed of a movable member body 40, side covers or lids 41, 41 fixed on both the side ends in the longitudinal direction of the movable member body 40 and end plates 42, 42 fixed on both the longitudinal ends thereof by means of screws 43—43.

The inverse U-shaped movable member 4 has an inner space into which the track member 2 is located and has inner surfaces facing the outer surfaces of the track member, and two rows of loaded rolling member rolling grooves 6, 6 are formed on each of the inner surface of the movable member 4 so as to correspond to or face on the rolling member rolling grooves 5, 5 formed on the track member 2, respectively. Each pair of these rolling member rolling grooves 5 and 6 form a loaded rolling member rolling passage 7 as a portion of a circulation passage of the rolling members 3—3. The movable member body 40 is formed with return passages 8 each having a circular shape in cross section and extending along the entire longitudinal direction, i.e. moving direction thereof. The side covers 41, 41 are formed with direction changing passages 9, 9, each connecting the loaded rolling member rolling passage 7 with the return passage 8. In this manner, endless circulation passages 10 are formed by the continuous connection of the loaded rolling member rolling passages 7, the return passages 8 and the direction changing passages 9 on both the sides of the track member 2 along the longitudinal moving direction thereof.

The rolling members 3—3 form a connection member 30 in association with spacers 31—31 disposed between adjacent rolling members 3, 3 and belts, each in thin plate structure, supporting the rolling members 3—3 so as to be movable on both the sides thereof, and that is, in the connection member 30, the rolling members 3—3 are connected by the spacers 31 and the belts in shape of a string of beads. The rolling members 3—3 circulate in the endless circulation passage 10 in the manner that when the movable member 4 is moved, the rolling members 3—3 are also moved in the loaded rolling member passage 7 and guided to one end side of the return passage 8 through the direction changing passage 9 on one end side, then moved along the return passage 8 toward the other one end side thereof, and then guided again to the loaded rolling member passage 7 through the other direction changing passage 9 on the other end side.

Figure 2:
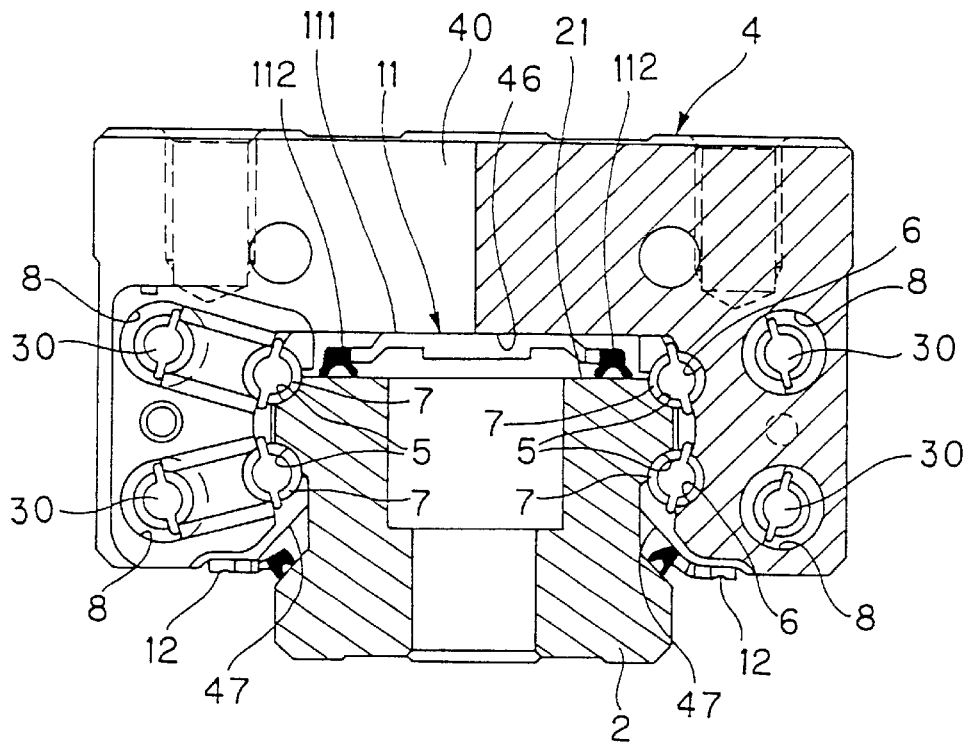
FIG. 2 is a view, partially in section, viewed from a direction perpendicular to a guiding direction of the rolling motion guide apparatus shown in FIG. 1.
Figure 3:
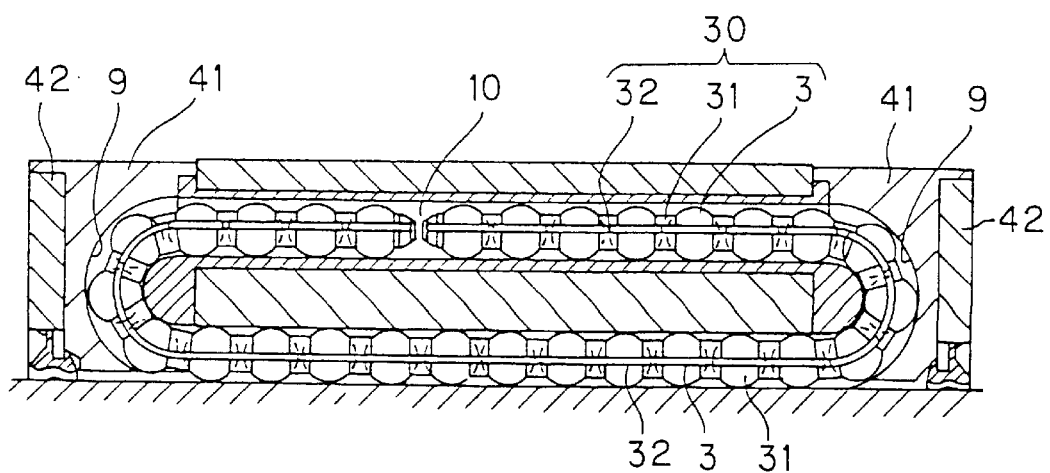
FIG. 3 is a sectional side view showing an endless circulation passage for rolling members of the apparatus shown in FIG. 1.

Seal members 11 and 12 are disposed on a horizontal surface 46 and both side surfaces 47, 47 of the movable member 4 facing the track member 2 as shown in FIG. 2. More specifically, the seal member 11 is disposed on the horizontal surface 46 of the movable member 4 facing the upper surface 21 of the track member 2 so as to extend in the movable member moving direction, i.e. the perpendicular direction to the drawing paper surface of FIG. 2. On the other hand, the seal members 12, 12 are disposed on the lower sides of the loaded rolling member passages 7, 7 so as to seal the same.

Figure 4:
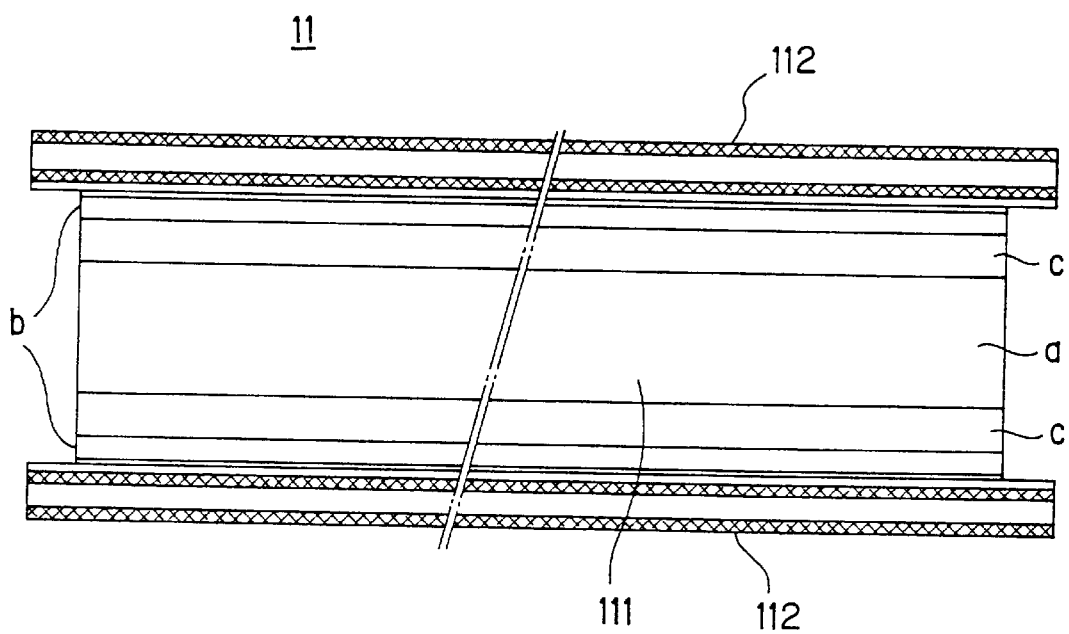
FIG. 4 is a back side view of a seal member to be mounted on the rolling motion guide apparatus of FIG. 1.
Figure 5:
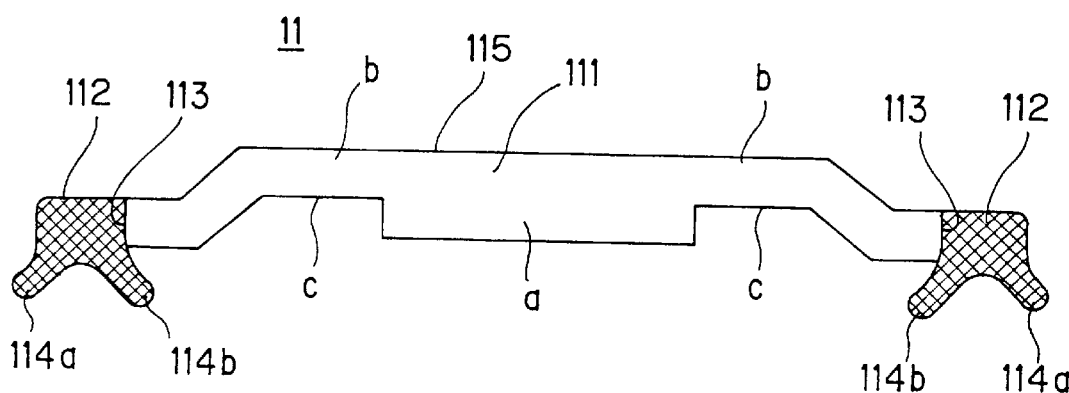
FIG. 5 is an end view of the seal member.
Figure 6:
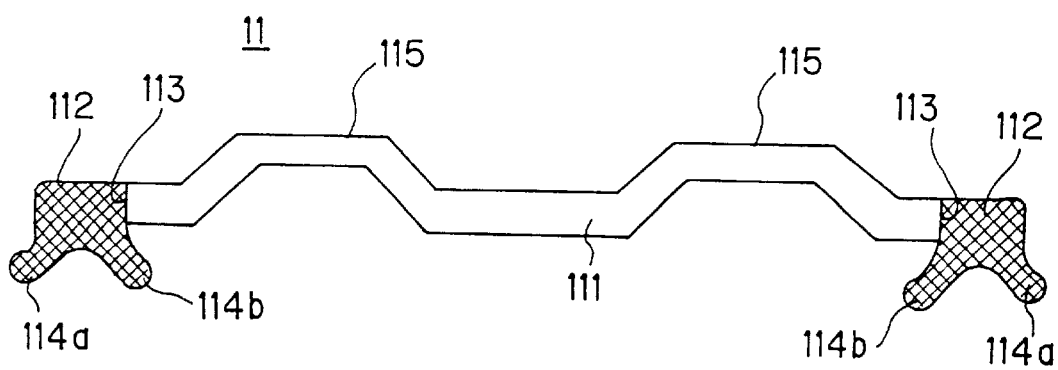
FIG. 6 is an end view of another seal member to be utilized for the rolling motion guide apparatus of the present invention.

FIGS. 4 to 6 show the detailed structure of the seal member 11. The seal member 11 is composed of a base plate portion 111 and sealing portions 112, 112 formed on both side edges 113, 113 of the base plate portion 111 so as to entirely extend therealong.

The base plate portion 111 is formed so as to have a trapezoidal shape in an entire structure and has a contact portion 115 abutting against the movable member 4. The base plate portion 111 includes a central thick portion having a large thickness sufficient for maintaining a proper rigidity of the base plate portion 111 and thin portions b, b having a small thickness on the sides of the side edge portions 113, 113. The back side surfaces, i.e., the lower side surfaces as viewed, of the thin portions b, b are formed with engaging grooves c, c to be engaged with engaging claws 402, 402 of engaging portions (FIG. 9) of the side covers 41, 41, respectively. The engaging groove c extends along the entire longitudinal direction of the base plate portion 111 and provides an inverse U-shaped cross section. However, this cross sectional shape is not limited to that shown in FIG. 5, and the base plate portion 111 may be formed so as to provide a cross sectional shape shown in FIG. 6, in which the contact portion 115 is partially formed. The base plate portion 111 may be formed of a resin material, preferably, a thermoplastic resin such as polyvinyl chloride, polyethylene, polystyrene, polypropylene, ABS resin, or the like.

The sealing portions 112, 112 arranged on the both side edge portions 113, 113 of the base plate portion 111 are formed of a resin material and have front end portions, each in shape of fork in section, so as to provide lip portions 114, 114 (each being formed of lip portions 114a, 114b) having round distal end portions as shown in FIG. 5 or 6. In a preferred embodiment, it is desired to make shorter the length of the lip portion 114a near the loaded rolling member rolling passage (FIG. 2) than that of the other lip portion 114b positioned apart from the lip portion 114a with respect to the loaded rolling member passage 7 when assembled. Further, it may be preferred to form the sealing portions of a thermoplastic resin such as polyvinyl chloride, polyethylene or the like, but it is not limited to such resin material in the present invention and a rubber material may be utilized.

Figure 7:
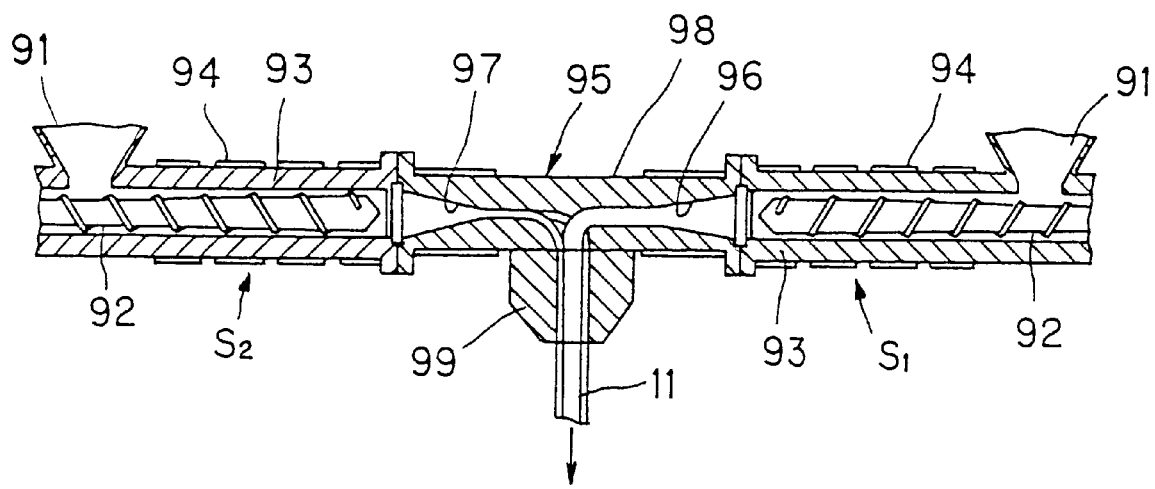
FIG. 7 is a sectional side view, partially cut away, of an apparatus for molding the seal member used for the rolling motion guide apparatus of the present invention.
Figure 8:
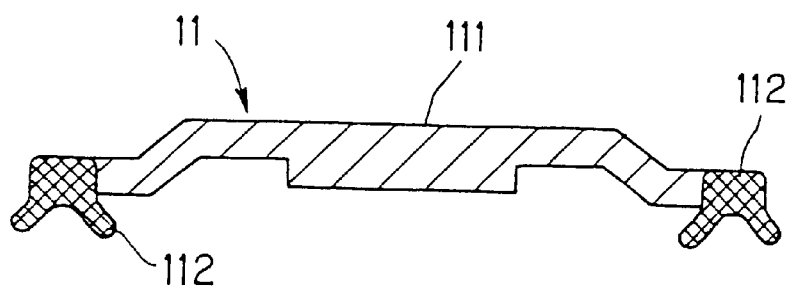
FIG. 8 is an end view of a seal member formed by the molding apparatus of FIG. 7.

The base plate portion 111 and the sealing portions 112, 112 are integrally formed with each other by an extrusion molding process so as to provide the seal member 11. FIG. 7 shows one example of a molding apparatus D for molding the seal member 11.

With reference to FIG. 7, the molding apparatus D is provided with a first extrusion section S1 for forming the base plate portion 111 and a second extrusion section S2 for forming the sealing portions 112, 112. Each of these extrusion sections S1 and S2 is provided with a horn-shaped hopper 91 through which a raw material is fed, a barrel 93 into which the raw material is fed through the hopper 91, a screw 92 disposed in the barrel 93 at substantially the central portion of the extrusion section for extruding the raw material, and a heater 94 disposed at the outer peripheral portion of the barrel 93 to heat the raw material in the barrel to a predetermined temperature. Both the extrusion sections S1 and S2 are connected to each other by means of a die 95 at the axial feed end portions of the screws 92, 92. The die 95 is a mold for molding the raw material so as to provide a desired shape and is provided with a material guide section 98 having a first supply passage 96 for supplying a raw material for the base plate portion 111 from the extrusion section S1 and a second supply passage 97 for supplying a raw material for the sealing portions 112 from the extrusion section S2 and a mixing section 99 for mixing these materials together.

The raw material for the base plate portion 111 is fed into a material feeding portion 98 of the die 95 through the first feeding passage 96 by the extrusion section S1. The raw material passes the material feeding portion 98 while being gradually formed into a shape of the base plate portion 111. On the other hand, the raw material for the sealing portion 112 is extruded by the extrusion section S2, fed into the material feeding portion 98 of the die 95 through the second feeding passage 97 and, then, passes the material feeding portion 98 while being gradually formed into a shape of the sealing portion 112. As shown in FIG. 7, the second feeding passage 97 is positioned at each side of the first feeding passage 96 at the central portion of the material feeding portion 98.

Thereafter, both the raw materials for the base plate portion 111 and the sealing portions 112 are supplied to the mixing portion 99, and during the time when the raw materials pass through the mixing portion, both the raw materials are formed integrally into the seal member 11 of the rolling motion guide apparatus according to the embodiment of the present invention mentioned above.

FIGS. 9 to 12 show the various states of the side cover 41 to which the seal member 11 is attached. As shown in these figures, the side cover is formed with an engaging portion 400, which is positioned at a portion of the side cover corresponding (opposing, when assembled,) to the upper surface 21 of the track member (see FIG. 2). The engaging portion 400 is composed of a recessed fit portion 401 and engaging claws 402, 402. The base plate portion 111 is fitted into this recessed fit portion 401, which has a cross sectional shape substantially equal to that of the base plate portion 112. The engaging claws 402, 402 can be engaged with the engaging grooves c, c formed on the base plate portion 111 as mentioned before. The engaging claw 402 projects toward the movable member body 40 (see FIG. 1) and has an inclining surface 403.

Figure 12A:
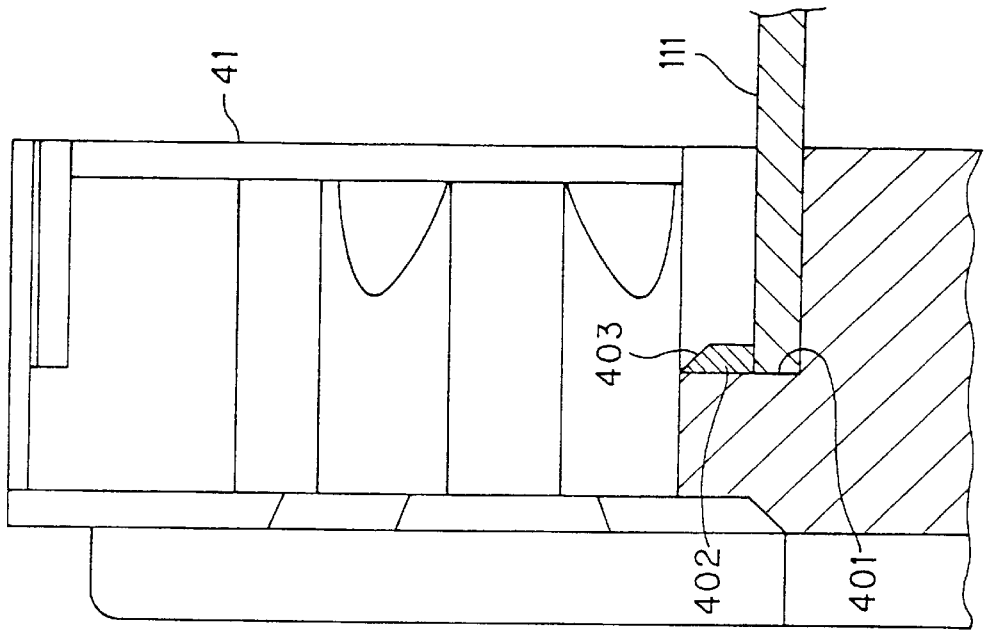
FIGS. 12A and 12B are views showing a process for mounting the seal member on the side cover.
Figure 12B:
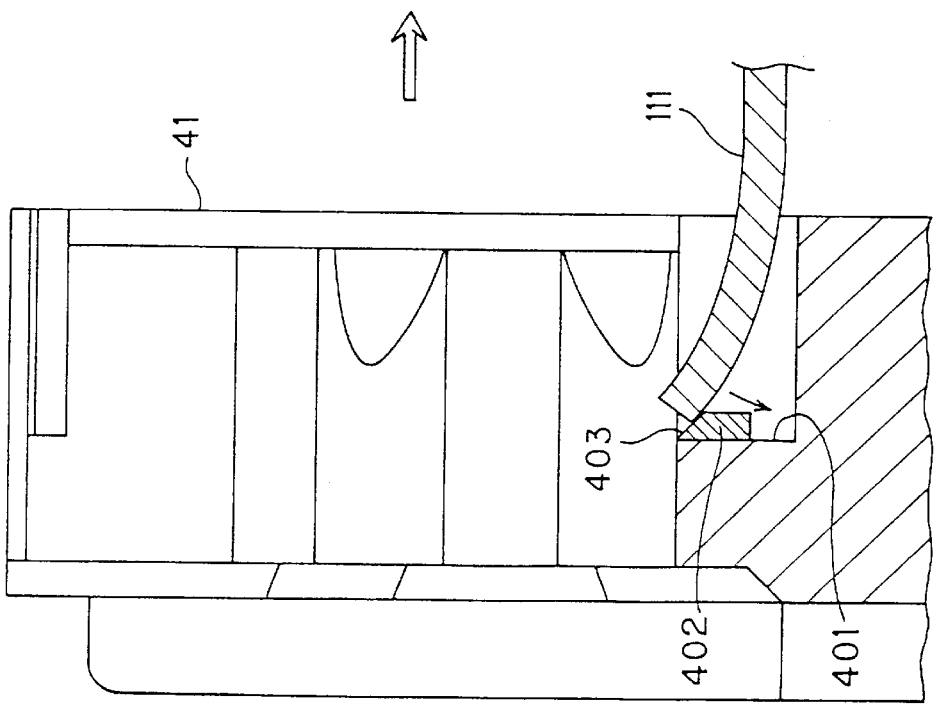

The seal member 11 is attached to the side cover 41 in the following manner. First, as shown in FIG. 12, the base plate portion 111 is arranged so that the end surface in the longitudinal direction of the base plate portion 111 is positioned so that the upper side surface, as viewed in FIG. 5, of the base plate portion 111 abuts against the inclining surface 403 of the engaging claw 402 (see FIG. 12B) and then the end surface portion of the base plate portion 111 is pushed into the recessed fit portion 401 so as to establish the engaging state. FIG. 12A shows a state that the base plate portion 111 of the seal member 11 is fitted into the engaging portion 400. In this engagement, since the engaging claw 402 is formed with the inclining surface 403, the base plate portion 111 can smoothly be fitted into the recessed fit portion 401 by sliding the end surface portion of the base plate portion along the inclining surface 403. Further, the engaging grooves c, c, mentioned before with reference to FIGS. 4 and 5, are arranged at portions at which they are engaged with the engaging claws 402, 402 of the engaging portion 400, whereby the seal member 11 can be prevented more surely from being disengaged from the side covers 41, 41.

Figure 9:
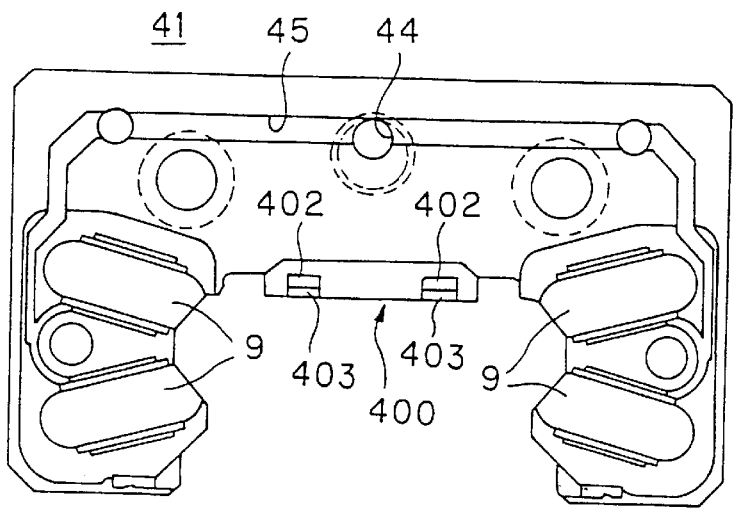
FIG. 9 is a view showing a surface of a side cover facing a body of a movable member of the rolling motion guide apparatus.
Figure 10:
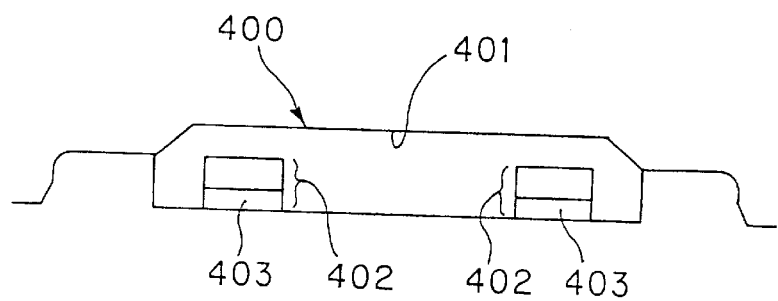
FIG. 10 is an enlarged front view of an engaging portion shown in FIG. 9.
Figure 11:
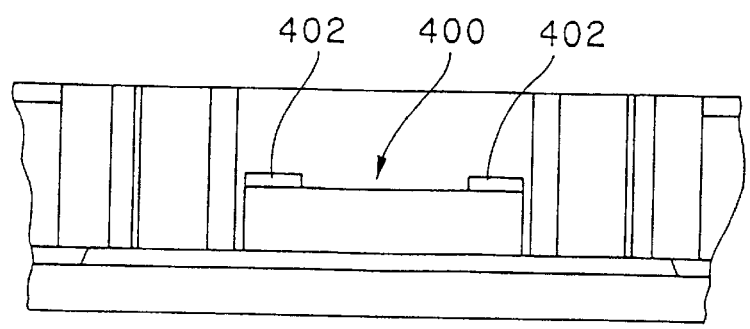
FIG. 11 is an enlarged back side view of the engaging portion shown in FIG. 9.
Figure 13:
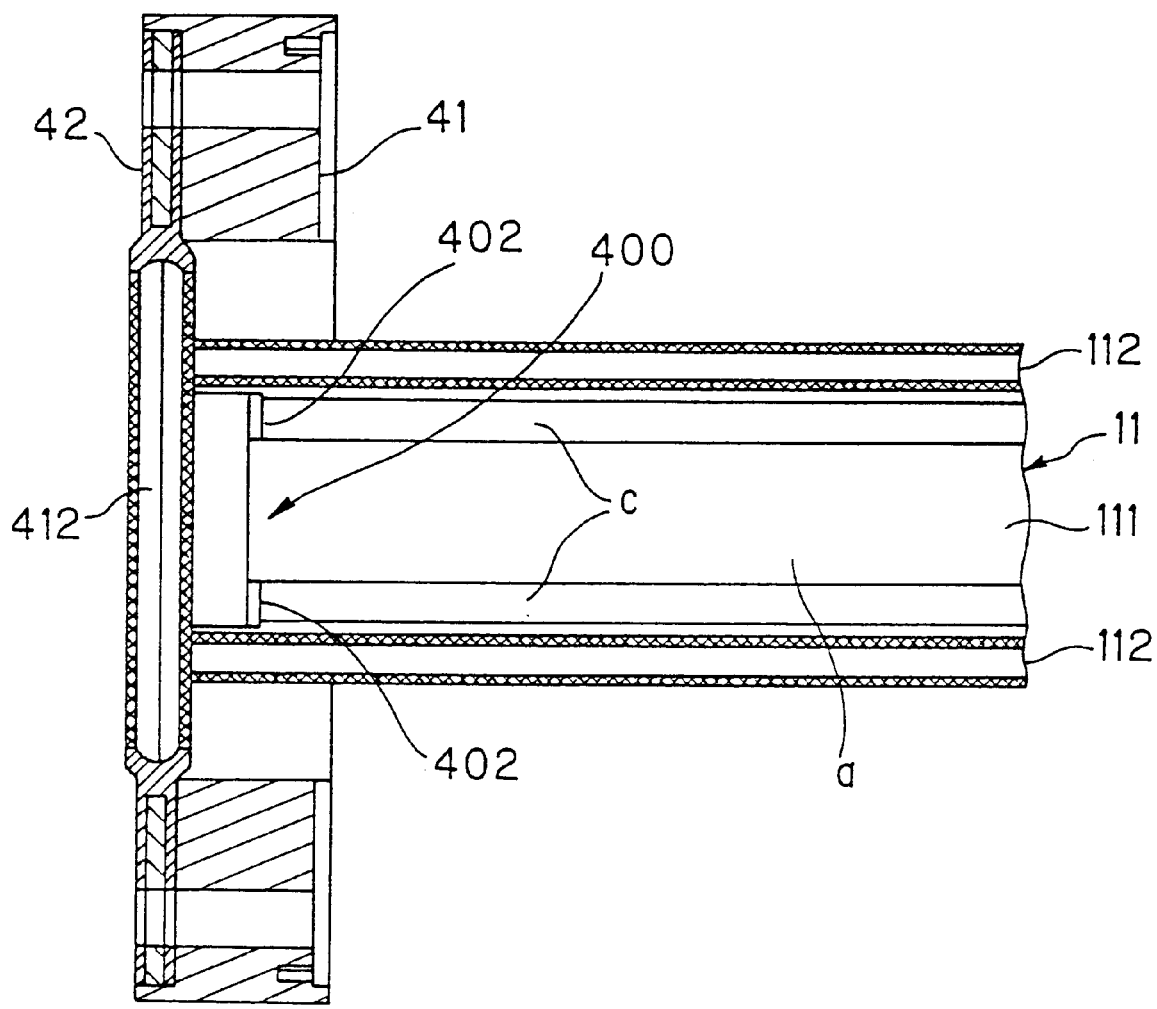
FIG. 13 a back side view showing a state of the seal member mounted on the side cover.

FIG. 13 shows a seal member attaching state, in which the end surface of the sealing portion 112 is attached in an abutting state to the side surface of the sealing portion 412 of the end plate 42. According to the construction of the seal member 11 in the manner mentioned above, the gap between the upper surface 21 of the track member 2 and the movable member 4 can be substantially completely sealed, and the invasion of the foreign material into the loaded rolling member rolling passage 7 from the central side of the guide apparatus 1 can be effectively prevented. Furthermore, though not shown, the sealing portions of the seal member 12 which seals the loaded rolling member rolling passage 7 from the lower side may also be constructed by abutting the longitudinal end portion thereof against the sealing portion 412 of the end plate 42. According to the location of the sealing portions 112 and 412 of the respective seal members, the loaded rolling member rolling passage 7 can be sealed at its both the moving direction and the direction normal thereto of the movable member 4, thus improving the dust proof effect. Furthermore, in order to ensure the smooth rolling of the rolling members 3—3 in the endless circulation passage 10, lubricant such as grease may be applied to the endless circulation passage 10. The lubricant is fed through the filling port 44 (FIG. 1) and then supplied to the direction changing passage 9 through a lubricant guiding passage 45 formed on the side cover 41 as shown in FIG. 9. In this viewpoint, the lubricant can also be prevented from leaking by locating the sealing portions 112 and 412 of the respective seal members in the manner mentioned above.

It is finally to be noted that the present invention is not limited to the described embodiment and many other changes or modifications may be made without departing from the scopes of the appended claims.

For example, in the described embodiment, although the rolling motion guide apparatus 1 provided with the endless circulation passage 10 is referred to, the present invention will be applicable to a rolling motion guide apparatus provided with a circulation passage having its ends.

What is claimed is:

1. A rolling motion guide apparatus comprising:
   a track member provided with a rolling member rolling groove along a longitudinal direction of the track member;
   a plurality of rolling members rolling along the rolling member rolling groove formed on the track member;
   a movable member provided with a loaded rolling member rolling groove which constitutes a loaded rolling member rolling passage in association with the rolling member rolling groove formed on the track member, said movable member being movable along the track member through the rolling members rolling in the loaded rolling member rolling passage; and
   a seal member provided on a surface of the movable member facing the track member,
   wherein said seal member comprises a base plate portion disposed along the surface of the movable member facing the track member and sealing portions disposed to longitudinal side edge portions of the base plate portion so as to be contacted to the track member, said base plate portion being formed of resin material different from resin material of which said sealing portions are formed, and said base plate portion and said sealing portions being integrally molded with each other through an extrusion process.

2. The rolling motion guide apparatus according to claim 1, wherein said base plate portion is provided with an abutting portion having a surface which is perpendicular to a moving direction of the movable member and which has substantially a trapezoidal shape in section.

3. The rolling motion guide apparatus according to claim 1, wherein said base plate portion has a central portion in its sectional view which has a thickened portion and the side edge portions on which the sealing portions are disposed and which have thin thickness portions with respect to the thickened central portion.

4. The rolling motion guide apparatus according to claim 1, wherein said base plate portion and said sealing portions are formed of different kinds of thermoplastic materials respectively.

5. A rolling motion guide apparatus comprising:

a track member provided with a rolling member rolling groove along a longitudinal direction of the track member;

a plurality of rolling members rolling along the rolling member rolling groove formed on the track member;

a movable member provided with a loaded rolling member rolling groove which constitutes a loaded rolling member rolling passage in association with the rolling member rolling groove formed on the track member, said movable member being movable along the track member through the rolling members rolling in the loaded rolling member rolling passage;

side covers fixed on both end surfaces of the movable member in the moving direction thereof; and a seal member provided on a surface of the movable member facing the track member, wherein said seal member comprises a base plate portion disposed along the surface of the movable member facing the track member and sealing portions disposed to longitudinal side edge portions of the base plate portion so as to be contacted to the track member, said side covers and said base plate portion are formed with engaging portions respectively, which are engaged with each other so as to hold the base plate portion of the seal member on the surface of the movable member facing the track member, and said base plate portion of the seal member is mountable on the end portions of the movable member through said engaging portions, with said side covers being fixed thereto.

6. The rolling motion guide apparatus according to claim 5, wherein said base plate portion is provided with an abutting portion having a surface which is perpendicular to a moving direction of the movable member and which has substantially a trapezoidal shape in section.

7. The rolling motion guide apparatus according to claim 5, wherein said base plate portion has a central portion in its sectional view which has a thickened portion and the side edge portions on which the sealing portions are disposed and which have thin thickness portions with respect to the thickened central portion.

8. The rolling motion guide apparatus according to claim 5, wherein said base plate portion is formed of resin material different from resin material of which said sealing portions are formed, and said base plate portion and said sealing portions are integrally molded with each other through an extrusion process.

9. The rolling motion guide apparatus according to claim 8, wherein said base plate portion and said sealing portions are formed of different kinds of thermoplastic materials respectively.

10. The rolling motion guide apparatus according to claim 5, wherein said engaging portion formed on each of said side covers at a portion facing a surface of the track member comprises a recessed fit portion having a size allowing the base plate portion to be fitted and engaging claw pieces engaged with engaging grooves formed on the base plate portion.

11. The rolling motion guide apparatus according to claim 10, wherein each of said engaging claw pieces has an inclined surface portion along which the base plate portion slides when fitted.

* * * * *